United States Patent [19]

Cunningham

[11] Patent Number: 5,323,088
[45] Date of Patent: Jun. 21, 1994

[54] DIMMING CONTROL CIRCUIT

[75] Inventor: David W. Cunningham, Los Angeles, Calif.

[73] Assignee: Gregory Esakoff, Huntington Beach, Calif.

[21] Appl. No.: 63,839

[22] Filed: May 11, 1993

Related U.S. Application Data

[63] Continuation of Ser. No. 759,500, Sep. 13, 1991, abandoned.

[51] Int. Cl.⁵ ............................................. G05F 1/00
[52] U.S. Cl. ...................................... 315/195; 315/198; 315/199; 315/291; 315/DIG. 4
[58] Field of Search ............... 315/294, 195, 198, 205, 315/250, 252, 313, 314, 315, 312, 324, 295, 296, 297, 199, 291, DIG. 4

[56] References Cited

U.S. PATENT DOCUMENTS

| | | | |
|---|---|---|---|
| 3,113,293 | 12/1963 | Breese et al. | 246/473.3 |
| 3,193,728 | 7/1965 | Skirpan | 315/251 |
| 3,222,573 | 12/1965 | Lord | 315/194 |
| 3,265,907 | 9/1966 | Kurata et al. | 307/321 |
| 3,290,555 | 12/1966 | Davis | 315/194 |
| 3,299,319 | 1/1967 | Nomura | 315/199 |
| 3,358,186 | 12/1967 | Nomura | 315/194 |
| 3,369,150 | 2/1968 | Malmin | 315/194 |
| 3,434,039 | 3/1969 | Misencik et al. | 323/327 |
| 3,496,451 | 2/1970 | Duncan | 323/326 |
| 3,517,259 | 6/1970 | Dotto | 315/200 |
| 3,523,212 | 8/1970 | Murphy | 315/291 |
| 3,614,527 | 10/1971 | Wirtz | 315/199 |
| 3,684,919 | 8/1972 | Cramer | 315/194 |
| 3,757,199 | 9/1973 | Minks | 322/28 |
| 3,789,211 | 1/1974 | Kramer | 315/195 |
| 3,927,349 | 12/1975 | Suhren et al. | 315/205 |
| 4,057,751 | 11/1977 | Bonsignore et al. | 315/294 |
| 4,093,943 | 6/1978 | Knight | 340/220 |
| 4,213,075 | 7/1980 | Ericson | 315/83 |
| 4,241,295 | 12/1980 | Williams, Jr. | 315/294 |
| 4,290,057 | 9/1981 | Knight | 340/539 |
| 4,395,660 | 7/1983 | Waszkiewicz | 315/291 |
| 4,478,468 | 10/1984 | Schoen et al. | 315/291 |
| 4,904,906 | 2/1990 | Atherton et al. | 315/291 |
| 5,004,957 | 4/1991 | Cunningham | 315/199 |

FOREIGN PATENT DOCUMENTS

| | | |
|---|---|---|
| 7729136 | 12/1977 | Fed. Rep. of Germany . |
| 4005012 | 8/1991 | Fed. Rep. of Germany . |

Primary Examiner—Robert J. Pascal
Assistant Examiner—Haissa Philogene
Attorney, Agent, or Firm—Pretty, Schroeder, Brueggemann & Clark

[57] ABSTRACT

A dimming control circuit for a plurality of lighting fixtures includes a separate semiconductor power switch, e.g., a silicon-controlled rectifier or SCR, for providing controlled amounts of pulsed, unidirectional electrical current to each lighting fixture. In one embodiment, a pair of SCRs, arranged in parallel, opposed relationship, are controllably pulsed to produce an alternating sequence of positive and negative electrical current pulses, of independently-controlled duration, and oppositely-conducting diodes then connect these SCRs to two separate lighting fixture. One such lighting fixture thus receives the positive current pulses, and the other such lighting fixture thus receives the negative current pulses. In an alternative embodiment, each lighting fixture receives pulsed, unidirectional current directly from a separate, independently-controlled SCR.

22 Claims, 4 Drawing Sheets

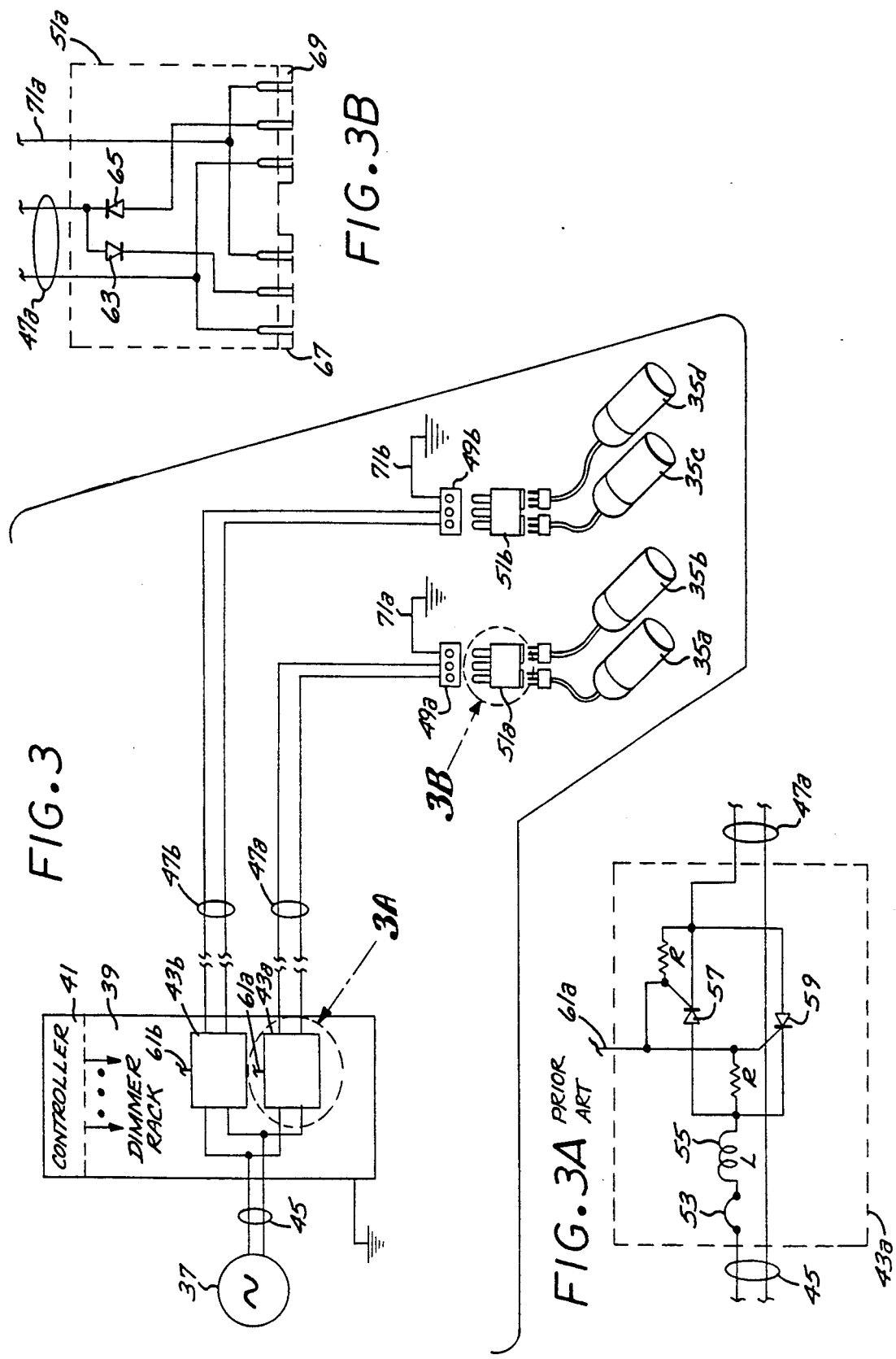

5,323,088

DIMMING CONTROL CIRCUIT

This application is a continuation of application Ser. No. 07/759,500, filed Sep. 13, 1991, now abandoned.

BACKGROUND OF THE INVENTION

Field of the Invention

This invention relates generally to dimming control circuits for lighting fixtures and, more particularly, to dimming control circuits that include ac power sources and semiconductor power switches.

Description of the Related Art

Dimming control circuits of this particular kind are commonly used in many applications, including theater, television, and architectural lighting applications. In such applications, a number of banks of separate lighting fixtures are typically included, with the dimming control circuit independently controlling the light intensity provided by each fixture or group of fixtures. Continuous control is generally provided, from full intensity down to zero intensity.

An example of a conventional dimming control circuit of this particular kind is depicted in FIG. 1. It includes an ac power source 11, a dimmer rack 13, and a plurality of lighting fixtures 15a–15d. The power source delivers ac electrical current over a pair of lines 17 to the dimmer rack, and the dimmer rack controllably directs selected amounts of ac current to the various lighting fixtures over separate pairs of wires 19a–19d. The lighting fixtures can be connected to their associated pair of wires by conventional three-prong plugs and sockets 21a–21d. The third prongs of the associated plugs and sockets are connected to ground via wires 22a–22d.

The dimmer rack 13 includes separate switching circuits 23a–23d for controllably switching the electrical current being supplied to the lighting fixtures 15a–15d, respectively. Each switching circuit includes, in series, a circuit breaker 25, an inductor or choke 27, and two silicon-controlled rectifiers (SCRs) 29a and 29b arranged in parallel, opposed relationship. The SCRs are controllably switched ON by an appropriate control signal supplied on line 31a from a controller 33 that is part of the dimmer rack. Each SCR is switched ON at a selected time during each successive cycle of the ac electrical power, to provide the desired degree of dimming. The choke is provided in each switching circuit to reduce audible and electrical noise that otherwise could arise from a rapid change in electrical current magnitude. As is conventional, the SCRs can be substituted by a single triac.

FIG. 2 shows several waveform diagrams useful in understanding how each switching circuit 23a–23d controls the intensity of light emitted by its associated lighting fixture 15a–15d. This intensity control is achieved by controlling the time at which the SCRs 29a and 29b are switched ON during each cycle of the ac electrical power. Two full cycles of the ac power signal are depicted in line (a), and the control signal coupled to the control electrodes of the parallel, opposed SCRs is depicted in line (b). This control signal includes a series of pulses of uniform width, each pulse occurring during a separate half cycle of the ac power signal. Each pulse functions to switch ON whichever of the two SCRs is forwardly biased at that time. Because the same control signal is applied to both SCRs, and because the two SCRs are connected in parallel, opposed relationship, they are switched ON in an alternating fashion and they cooperate to supply a current like that depicted in line (c) of FIG. 2. The rms value of this pulsed current controls the intensity of light that the associated lighting fixture will emit.

In another prior dimming control circuit, described in U.S. Pat. No. 5,004,957, the control signal includes just a single pulse for each cycle of the ac power signal. Only one SCR of the pair is used in the 0% to 50% brightness range, but both SCRs are used in the 50% to 100% brightness range. This provides reduced acoustic and electrical noise, because of the control signal's reduced operating frequency.

The conventional dimming control circuits of the kind described above function generally satisfactorily in providing a continuous control of the intensity of light emitted by a series of lighting fixtures. Nevertheless, it is believed that these conventional dimming control circuits are unduly inefficient, requiring significantly more electrical components and interconnecting power lines than are necessary. It should, therefore, be appreciated that there is a need for a more simplified dimming control circuit, which can operate to control the light output of a number of lighting fixtures, with a reduced number of electrical components and interconnecting power lines. The present invention fulfills this need.

SUMMARY OF THE INVENTION

This invention is embodied in a dimming control circuit for a plurality of lighting fixtures, which operates efficiently in directing selected amounts of electrical current from an ac power source to each lighting fixture. The circuit includes a plurality of semiconductor power switches (e.g., silicon-controlled rectifiers, or SCRs), each connected between the ac power source and a separate lighting fixture, and each adapted to couple electrical current to its associated fixture in only one direction. Phase control signal generator means are provided for generating a plurality of independent control signals, each for coupling to the control electrode of a separate semiconductor power switch, to condition that switch to couple a selected amount of electrical current to the associated lighting fixture only during the positive half cycles, or only during the r negative half cycles, of the ac electrical power. In this fashion, the number of semiconductor power switches is reduced to just one per lighting fixture. In addition to including a reduced number of electrical components, the dimming control circuit of the invention couples power to the lighting fixtures over fewer interconnecting power lines.

In one embodiment of the invention, the hardware of a conventional dimmer rack is used in an unmodified form, but the software used in its controller is modified to provide separately-controlled pulses for the positive and negative half cycles of the ac power coupled to an associated pair of lighting devices. Thus, positive current pulses of selected duration are interleaved with negative current pulses, of independently-selected duration, for coupling over a common pair of power lines to an associated pair of lighting fixtures. At the location of those lighting fixtures, two diodes arranged in reverse directions couple either the positive current pulses or the negative current pulses to the appropriate lighting fixture.

In an alternative embodiment, a separate semiconductor power switch is connected to couple electrical power directly to each lighting fixture, without the need for an additional diode. Like the first embodiment, electrical current is supplied to the lighting fixture only during either the positive half cycles or the negative half cycles of the ac power. In this case, the semiconductor power switches are preferably located remotely, at the sites of the lighting fixtures being controlled, and the chokes can be located either centrally, in the dimmer rack itself, or remotely, at the sites of the lighting fixtures.

Other features and advantages of the present invention should become apparent from the following #description of the preferred embodiments, taken in conjunction with the accompanying drawings, which illustrate, by way of example, the principles of the invention.

BRIEF DESCRIPTION OF THE DRAWINGS

FIGS. 1 and 1A are simplified schematic block diagrams of a conventional dimming control circuit, for providing independent dimming control for four separate lighting fixtures.

FIGS. 3, 3A and 3B are simplified schematic block diagrams of a first embodiment of a dimming control circuit in accordance with the invention, this embodiment utilizing the hardware of a conventional dimming control circuit like that of FIG. 1, but requiring only one-half the number of switching circuits to control the same number of lighting fixtures.

DESCRIPTION OF THE PREFERRED EMBODIMENTS

Figure 1:
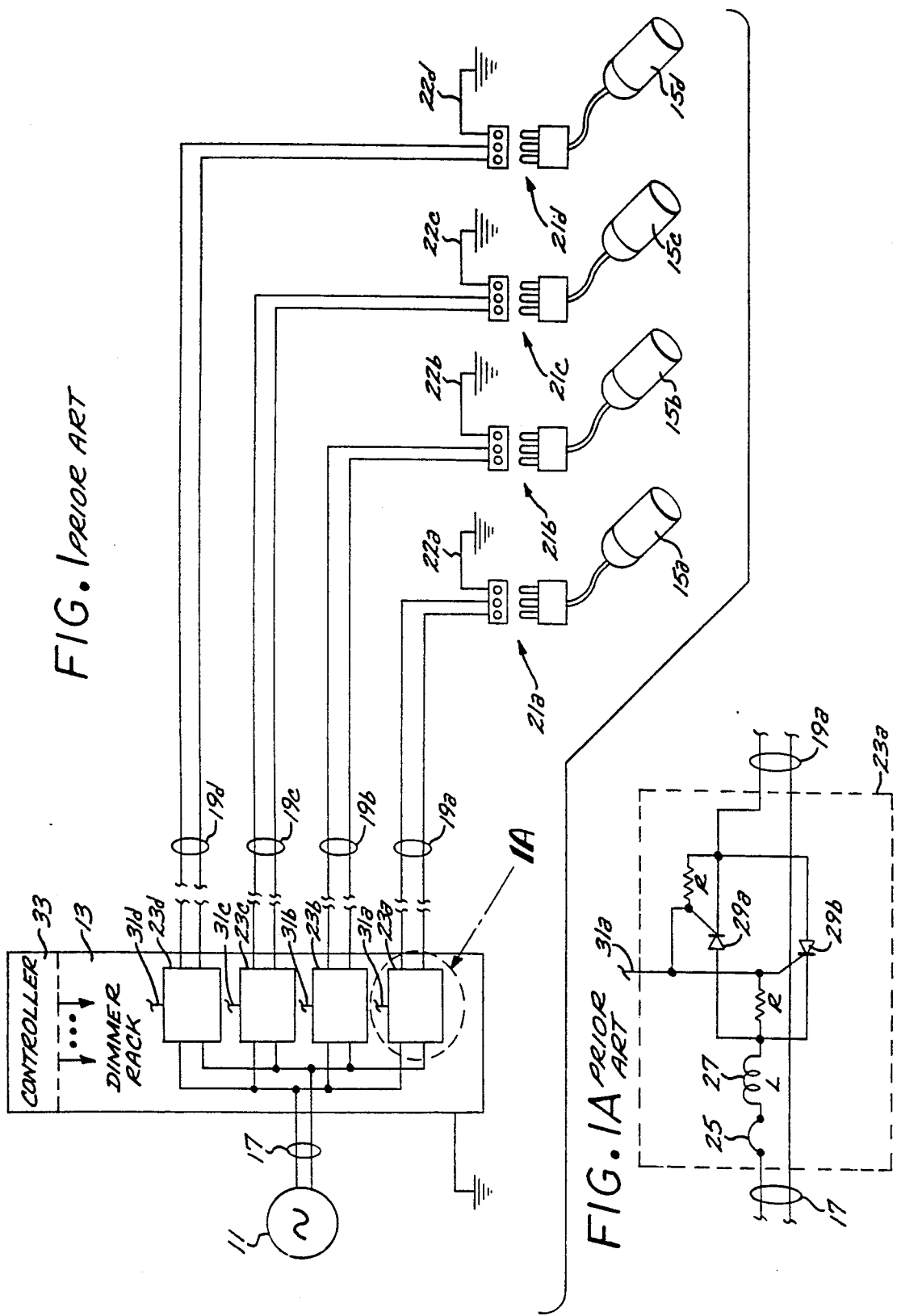
Figure 2:
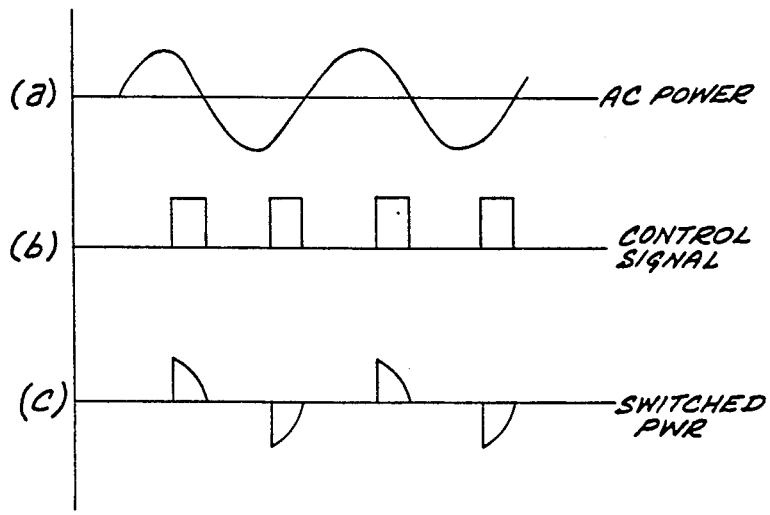
FIG. 2 is a timing diagram showing the ac power signal and an exemplary control pulse signal and the resulting switched power signal for one lighting fixture in the dimming control circuit of FIG. 1.

With reference now to the drawings, and particularly to FIG. 3, there is shown a dimming control circuit for supplying controlled amounts of ac electrical current to a plurality of remote lighting fixtures, four of which are identified by the reference numerals 35a–35d. The dimming control circuit includes an ac power source 37 and a dimming rack 39 for independently controlling the amount of electrical current coupled to each of these lighting fixtures, thus controlling the intensity of light emitted by these lighting fixtures. The hardware portion of the dimmer rack is identical to that of the conventional dimmer rack depicted in FIG. 1. However, the software portion of the dimmer rack, which is implemented by its controller 41, operates such that each of the dimmer rack's switching circuits is conditioned to supply controlled amounts of electrical current, independently, to two separate lighting fixtures, rather than merely one. Two of these switching circuits are identified in FIG. 3 by the reference numerals 43a and 43b.

Power is delivered to the two switching circuits 43a and 43b from the ac power source 37 via lines 45, including a supply line and a return line, and two sets of power lines 47a and 47b, each including a supply line and a return line, supply electrical power from the two switching circuits to their associated pairs of remote lighting fixtures 35a and b and 35c and d. The two sets of power lines supply the power to a remote socket 49a or 49b for each pair of lighting fixtures, and a special adapter 51a or 51b plugs into each socket to separate the supplied power into two separate power signals, one for each lighting fixture. Thus, a substantial reduction in hardware components and interconnecting wiring is provided.

More particularly, each switching circuit 43a or 43b in the dimmer rack 39 includes a circuit breaker 53, an inductor or choke 55, and first and second silicon-controlled rectifiers (SCRs) 57 and 59 arranged in parallel, opposed relationship. The controller 41, which is part of the dimmer rack, provides a control pulse signal on line 61a or 61b to the control terminals of the two SCRs, to controllably switch the SCRs ON at selected times during each half cycle of the ac power signal.

In the dimming control circuit of FIG. 3, the controller 41 provides a separate control pulse signal for each switching circuit 43a or 43b that independently controls the two SCRs 57 and 59 in each switching circuit. Thus, the successive pulses of the control pulse signal that are associated with the positive half cycles of the ac power signal have durations determined in accordance with the desired light intensity for the first lighting fixture 35a, while the pulses associated with the successive negative half cycles have durations determined in accordance with the desired intensity of the second lighting fixture 35b.

Figure 5:
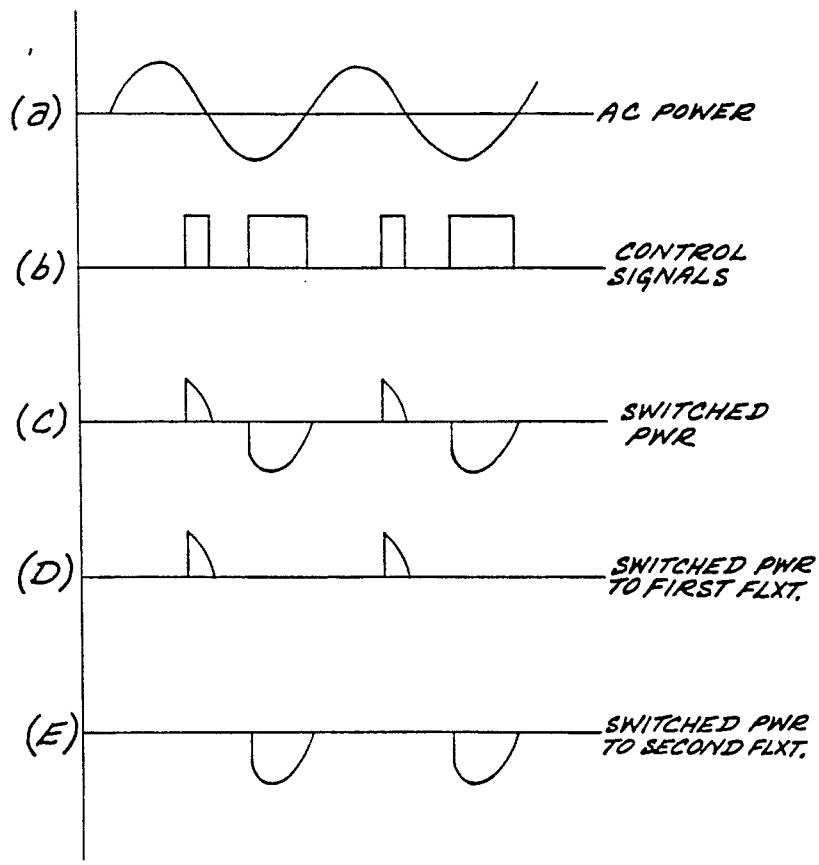
FIG. 5 is a timing diagram showing various exemplary signal waveforms present in the dimming control circuits of FIGS. 3 and 4.

An exemplary control pulse signal is depicted in FIG. 5(b), where it will be noted that the pulses associated with the positive half cycles are substantially narrower than the pulses associated with the successive negative half cycles. Consequently, the switched ac power signal provided by the switching circuit 43a will be as shown in FIG. 5(c). This pulsed power signal is transmitted over lines 47a to the remote socket 49a. As previously mentioned, an adapter 51a can be plugged into the socket to separate out the alternating positive and negative pulses, for coupling to the respective lighting fixtures 35a and 35b.

As shown in FIG. 3B, the adapter 51a accomplishes this separation in a straightforward manner using first and second diodes 63 and 65. The adapter itself includes two sockets 67 and 69, to which the respective lighting fixtures 35a and 35b can be releasably connected. One of the two incoming power lines 47a is connected through the first diode 63 to one terminal of the first socket 67, while that same incoming power line is connected through the second diode 65 to one terminal of the second socket 69. The other of the incoming power lines 47a is connected through the adapter directly to second terminals of the two sockets 67 and 69, while a ground line 71a likewise is connected through the adapter directly to third terminals of the two sockets.

The first diode 63 of the adapter 51a transmits to the first socket 67 only the positive pulses of the alternating positive and negative power pulses of the pulsed power signal on lines 47a (FIG. 5(c)), while the second diode 65 transmits to the second socket 69 only the negative power pulses of that pulsed power signal. Thus, the first diode transmits to the first socket a power signal like that depicted in FIG. 5(d), while the second diode transmits to the second socket a power signal like that depicted in FIG. 5(e). It will be appreciated that the rms power supplied to the first lighting fixture 35a is thus controlled by the duration of the control pulses occurring only during the positive half cycles of the ac power signal supplied by the power source 37, while the rms power supplied to the second fixture 35b is controlled by the duration of the pulses occurring during the negative half cycles. Because these pulse durations are independently controlled, the light intensities provided by the two fixtures likewise are independently controlled. In addition, because each lighting fixture receives electrical current pulses having a frequency equal to the fundamental frequency of the ac power signal, typically 60 Hz, rather than double that fundamental frequency, audible noise and electrical noise are reduced.

It also will be appreciated that the dimming control circuit of FIG. 3 provides a marked reduction in the number of electrical components over the conventional dimming control circuit of FIG. 1. In particular, each switching circuit 43a or 43b is adapted to controllably power two separate lighting fixtures, as contrasted with one such switching circuit required in the past to power each fixture. In addition, just a single pair of power lines 47a or 47b is required for each pair of lighting fixtures, as contrasted with a separate pair of power lines required in the past for each lighting fixture. Because the lighting fixtures frequently can be located at great distances from the dimmer rack 39, this reduction in wiring can lead to significant cost savings. In the U.S., most building codes require the use of a minimum wire size having a current-carrying capability, or ampacity, significantly greater than the needs of each lighting fixture. Consequently, because the invention enables two fixtures to be independently serviced by the same pair of power lines, the lines' excess ampacity can be utilized and a greater cost efficiency therefore can be achieved. Further, because the hardware of the dimmer rack 39 is identical to that of conventional dimming control circuits, the invention lends itself to a convenient retrofit of circuits already in use.

Still another advantage of the dimming control circuit of FIG. 3 is that coupling current to the lighting fixtures only on alternate half cycles of the ac power reduces the rms voltages applied to the fixtures. This can lead to a greater operating efficiency, because it is known that reducing the applied rms voltage, while correspondingly increasing the electrical current so as to maintain the same wattage, will provide increased emitted lumens. Moreover, this reduced rms voltage is achieved without the need for a step-down transformer.

Figure 4A:
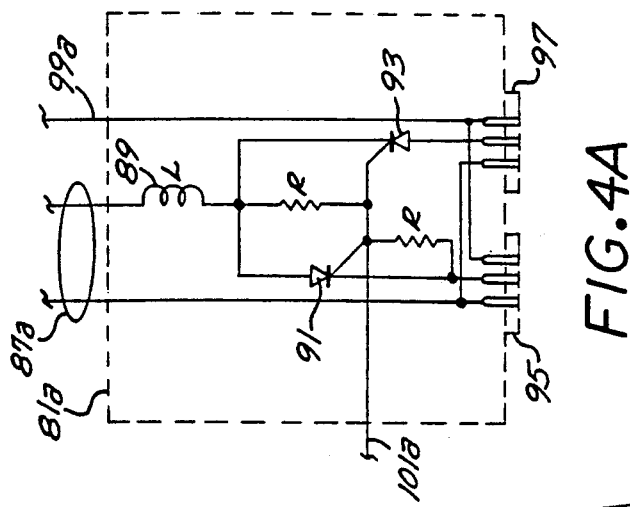
FIGS. 4 and 4A are simplified schematic block diagrams of a second embodiment of a dimming control circuit in accordance with the invention, this embodiment having its controller and semiconductor power switches located remotely, at or near the sites of the lighting fixtures being controlled.
Figure 4:
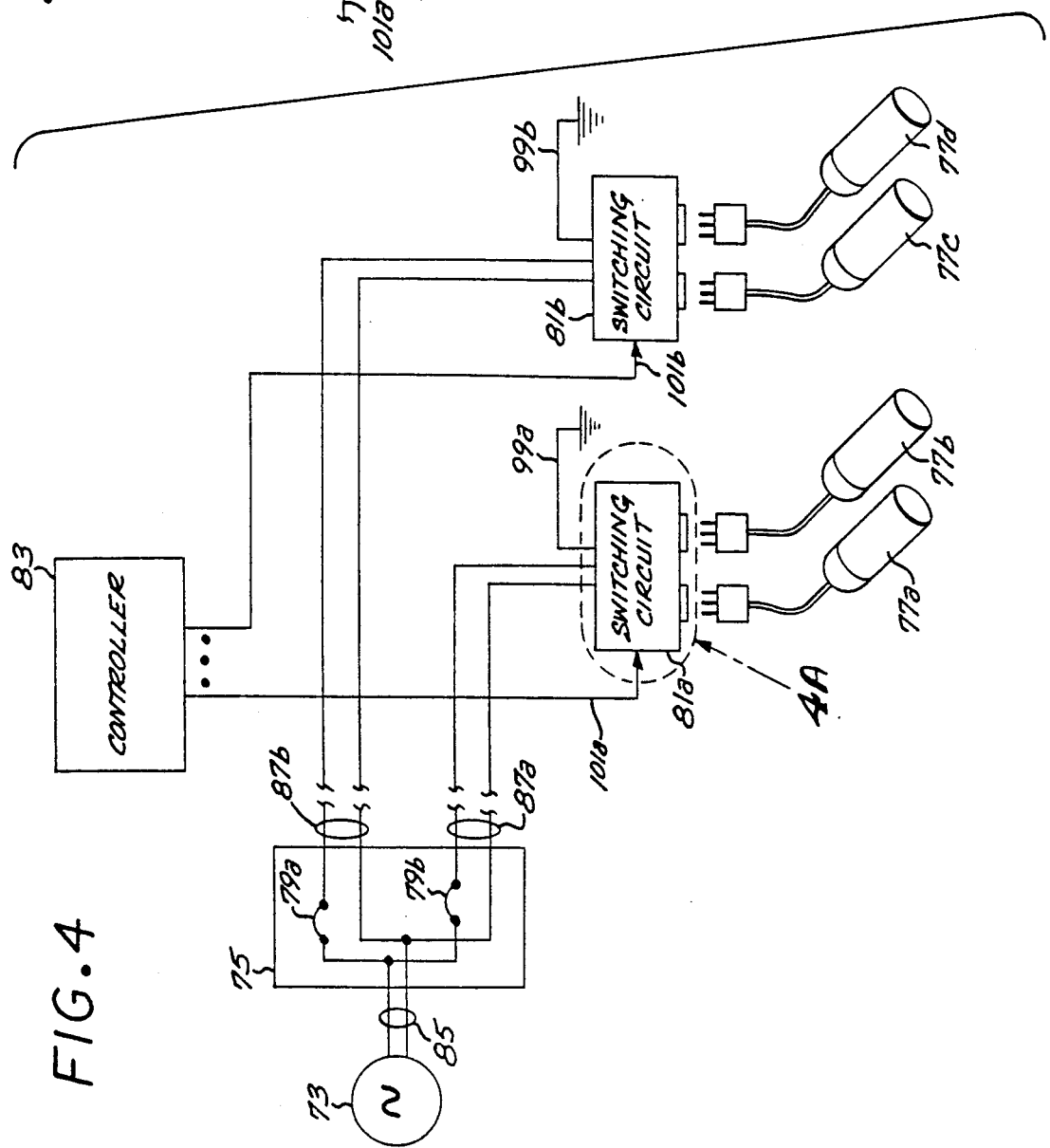

With reference now to FIG. 4, there is shown an alternative embodiment of a dimming control circuit in accordance with the invention. This embodiment includes an ac power source 73 and a circuit breaker panel 75 for supplying electrical power to a plurality of lighting fixtures, four of which are identified by the reference numerals 77a-77d. In this embodiment, SCRs for providing pulsed electrical current are not located in a central dimmer rack, but rather are located remotely, at the sites of the lighting fixtures being controlled. This eliminates the need for separate diodes, as in the FIG. 3 embodiment, to provide positive current pulses to one lighting fixture and negative current pulses to another.

More particularly, the circuit breaker panel 75 of the dimming control circuit includes a plurality of circuit breakers, two of which are identified by the reference numerals 79a and 79b. These circuit breakers provide power to separate, remote switching circuits 81a or 81b, which in turn provide controllably switched power to a plurality, e.g., four, of lighting fixtures. The switching circuits are controlled by a controller 83 that is located remotely, in the general vicinity of the lighting fixtures 77a-77d. Ac power is delivered from the ac power source 73 to the circuit breaker panel on lines 85, and the circuit breaker panel in turn supplies power to the two switching circuits 81a and 81b on pairs of lines 87a and 87b, respectively.

Each of the switching circuits 81a and 81b includes a single inductor or choke 89 and two SCRs 91 and 93, for controllably supplying pulsed electrical current to two sockets 95 and 97, to which can be selectively connected two separate lighting fixtures. In particular, one line of the pair of power lines 87a or 87b is connected through the first SCR 91 to one terminal of the first socket 95, and through the second SCR 93 to one terminal of the second socket 97. The second line of the pair of power lines 87a or 87b is connected directly to separate terminals of the two sockets 95 and 97, and a ground line 99a likewise is connected directly to separate terminals of the two sockets 95 and 97. The control electrodes of the two SCRs 91 and 93 receive a control pulse signal supplied on line 101a from the controller 83.

It will be appreciated that the dimming control circuit embodiment of FIG. 4 operates similarly to the circuit embodiment of FIG. 3, except that the diodes 63 and 65 of the FIG. 3 embodiment are eliminated because the output terminals of the two SCRs 57 and 59 are no longer ganged together. Thus, for a control pulse signal of the form depicted in FIG. 5(b), the first SCR 91 will transmit to the first socket 95 an electrical current signal like that depicted in FIG. 5(d), and the second SCR 93 will transmit to the second socket 97 a current waveform like that depicted in FIG. 5(e).

The FIG. 4 embodiment is configured such that the controller 83 can be located closer to the sites of the switching circuits 81a-b and the lighting fixtures 77a-d. This significantly reduces the need for using long runs of control lines. In addition, the circuit breaker panel 75 can be a standard, off-the-shelf item. In this embodiment, the chokes must be selected to emit reduced audible noise, because they are located at or near the sites of the lighting fixtures, rather than in an isolated control room.

In another alternative embodiment, similar to FIG. 4 but not shown in the drawings, the chokes are moved from the switching circuits back to the circuit breaker panel. This configuration is desirable in situations where low-noise chokes are unavailable and where acoustic noise at the sites of the lighting fixtures must be minimized.

In a variation of all of the embodiments described above, each choke and SCR can be substituted by a series-connected diode and transistor. Suitable transistors include bipolar transistors, field-effect transistors (FETs), and insulated-gate bipolar transistors (IGBTs). By operating the transistors in a linear mode, the equivalent function of an inductor can be effected.

It should be appreciated from the foregoing description that the present invention provides an improved dimming control circuit that can provide controlled amounts of pulsed ac power to a plurality of lighting fixtures, with substantially fewer electrical components and interconnecting power lines. Several circuit embodiments are disclosed, all of them including a single semiconductor power switch, e.g., a silicon-controlled rectifier, for coupling controlled amounts of pulsed electrical current in just a single direction, either positive or negative, to each lighting fixture.

Although the invention has been described in detail with reference only to the presently preferred embodiments, those of ordinary skill in the art will appreciate that various modifications can be made without departing from the invention. Accordingly, the invention is defined only by the following claims.

I claim:

1. A dimming control circuit for a plurality of lighting fixtures, comprising:
   an ac power source for supplying ac electrical power in an alternating series of positive and negative half cycles;
   a plurality of semiconductor power switches having a plurality of control electrodes, wherein the plurality of semiconductor power sources are connected between the ac power source and a plurality of lighting fixtures, and wherein the plurality of semiconductor power switches are arranged in one or more switch pairs, each switch pair providing electrical current for two associated lighting fixtures, and each switch pair including
   first and second switchable semiconductor devices arranged in parallel, opposed relationship,
   a first diode, connected between the first and second switchable semiconductor devices and a first of the two associated lighting fixtures and adapted to couple electrical current only in a positive direction through the first lighting fixture, and
   a second diode, connected between the first and second switchable semiconductor devices and a second of the two associated lighting fixtures and adapted to couple electrical current only in a negative direction through the second lighting fixture;
   phase control signal generator means for generating a plurality of independent control pulse signals for coupling to the control electrodes of the plurality of power switches, to condition each switch to couple a selected amount of electrical current in a single direction, positive or negative, through an associated lighting fixture, each lighting fixture receiving electrical current only via switch; and
   a central housing for housing the first and second switchable semiconductor devices of each switch pair of the plurality of semiconductor power switches and for housing the phase control signal generator means;
   wherein the plurality of lighting fixtures are located remote from the central housing; and
   wherein the first and second diodes of each switch pair of the plurality of semiconductor power switchers are located remote from the central housing, at or near their associated first and second lighting fixtures.

2. A dimming control circuit as defined in claim 1, wherein said switchable semiconductor device is a silicon-controlled rectifier.

3. A dimming control circuit as defined in claim 1, and further including a circuit breaker and choke connected in series with the ac power source and the semiconductor switch means.

4. A dimming control circuit as defined in claim 1, wherein:

the ac electrical power supplied by the ac power source has a predetermined fundamental frequency; and
the plurality of independent control signals generated by the phase control signal generator means have a fundamental frequency the same as the predetermined fundamental frequency of the ac electrical power.

5. A dimming control circuit for lighting fixtures, comprising:
   an ac power source for supplying ac electrical power in an alternating series of positive and negative half cycles;
   a first switchable semiconductor device for conducting electrical current from the ac power source in a positive direction to a first lighting fixture, the first switchable semiconductor device having a control electrode;
   a second switchable semiconductor device for conducting electrical current to the ac power source in a negative direction from a second lighting fixture, the second switchable semiconductor device having a control electrode;
   wherein the first and second switchable semiconductor devices are connected in parallel, opposed relationship with each other;
   a first diode connected between the first switchable semiconductor device and the first lighting fixture and adapted to conduct electrical current in a positive direction to the first lighting fixture;
   a second diode connected between the second switchable semiconductor device and the second lighting fixture and adapted to conduct electrical current in a negative direction from the second lighting fixture; and
   phase control signal generator means for generating independent first and second control signals for connection to the control electrodes of the first and second switchable semiconductor devices;
   wherein the first control signal is selected to condition the first switchable semiconductor device to a conductive state and thereby to couple electrical current through the first lighting fixture, only during the positive half cycles of the ac electrical power, via the first switchable semiconductor device and the first diode;
   and wherein the second control signal is selected to condition the second switchable semiconductor device to a conductive state, and thereby to couple such that electrical current through the second lighting fixture, only during the negative half cycles of the ac electrical power, via the second switchable semiconductor device and the second diode.

6. A dimming control circuit as defined in claim 5, wherein:
   the dimming control circuit further includes a central housing for housing the first and second switchable semiconductor devices and for housing the phase control signal generator means;
   the first and second lighting fixtures are located remote from the central housing; and
   the first and second diodes are located remote from the central housing, at or near the respective first and second lighting fixtures.

7. A dimming control circuit as defined in claim 5, wherein the first and second switchable semiconductor devices are silicon-controlled rectifiers.

8. A dimming control circuit as defined in claim 5, and further including a choke and a circuit breaker connected in series with the ac power source and the semiconductor switch means.

9. A dimming control circuit as defined in claim 5, wherein:
the ac electrical power supplied by the ac power source has predetermined fundamental frequency; and
the plurality of independent control signals generated by the phase control signal generator means have a fundamental frequency the same as the predetermined fundamental frequency of the ac electrical power.

10. A dimmable lighting system comprising:
an ac power source for supplying ac electrical power in an alternating series of positive and negative half cycles;
a first lighting fixture;
a second lighting fixture associated with the first lighting fixture;
a first switchable semiconductor device, connected between the ac power source and the first lighting fixture, for coupling electrical current only in a positive direction through the first lighting fixture, wherein the first switchable semiconductor device has a control electrode and is free of any parallel-connected switchable semiconductor device adapted to conduct current is negative direction, opposite the positive direction;
a second switchable semiconductor device, connected between the ac power source and the second lighting fixture, for coupling electrical current only in a negative direction through the second lighting fixture, wherein the second switchable semiconductor device has a control electrode and is free of any parallel-connected switchable semiconductor device adapted to conduct current in a positive direction, opposite the negative direction;
a housing for housing the first and second switchable semiconductor devices;
a single, multiple-conductor power line for coupling electrical current from the ac power source to the housing for the first and second switchable semiconductor devices; and
phase control signal generator means for generating a first control signal for coupling to the control electrode of the first switchable semiconductor device, to condition the first switchable semiconductor device to couple a selected amount of electrical current through the first lighting fixture, the first lighting fixture receiving electrical current only via the first switchable semiconductor device, the phase control signal generator means further generating a second control signal, independent of the first control signal, for coupling to the control electrode of the second switchable semiconductor device, to condition the second switchable semiconductor device to couple a selected amount of electrical current in a negative direction through the second lighting fixture, the second lighting fixture receives electrical current only via the second switchable semiconductor device.

11. A dimmable lighting system as defined in claim 10, wherein the first switchable semiconductor device is a silicon-controlled rectifier.

12. A dimmable lighting system as defined in claim 10, and further including a circuit breaker and choke connected in series with the ac power source and the first switchable semiconductor device.

13. A dimmable lighting system as defined in claim 10, wherein:
the ac electrical power supplied by the ac power source has a predetermined fundamental frequency; and
the plurality of independent control signals generated by the phase control signal generator means have a fundamental frequency the same as the predetermined fundamental frequency of the ac electrical power.

14. A dimming control circuit as defined in claim 1, wherein:
the first and second switchable semiconductor devices of each switch pair each include a control electrode;
the control electrodes of the first and second switchable semiconductor devices of each switch pair are electrically connected to each other; and
the phase control signal generator means generates first and second control pulse signals for the respective first and second switchable semiconductor devices of each switch pair and applies such first and second control pulse signals to the control electrodes of both the first and the second switchable semiconductor devices.

15. A dimming control circuit as defined in claim 5, wherein:
the control electrodes of the first and second switchable semiconductor devices are electrically connected to each other; and
the phase control signal generator means applies the first and second control signals to the control electrodes of both the first and the second switchable semiconductor devices.

16. A dimmable lighting system as defined in claim 10 wherein:
the control electrodes of the first and second switchable semiconductor devices are electrically connected to each other without any intervening components; and
the phase control signal generator means applies the first and second control signals to the control electrodes of both the first and the second switchable semiconductor devices.

17. A dimming control circuit for a plurality of lighting fixtures, comprising:
switching circuit means connected to an ac power source for controllably providing on a power line current pulses of a first selected duration of the positive half cycles of the ac power source and for controllably providing on the same power line current pulses of a second selected duration, independent of the first selected duration, of the negative half cycles of the ac power source; and
first and second oppositely-poled diodes connected between the power line of the switching circuit means and the first and second lighting fixtures, respectively, such that the power supplied to the first and second lighting fixtures is independently controlled.

18. A dimming control circuit as defined in claim 17, wherein:
the switching circuit means includes first and second silicon-controlled rectifiers connected in parallel, opposed relationship; and the switching circuit means includes a controller for generating independent first and second control pulse signals for application to the first and second silicon-controlled rectifiers.

19. A dimming control circuit as defined in claim 18, wherein:
the first and second silicon-controlled rectifiers each include a control electrode;
the control electrodes of the first and second silicon-controlled rectifiers are electrically connected to each other; and
the controller applies the first and second control pulse signals to the control electrodes of both the first and second silicon-controlled rectifiers.

20. A dimming control method for a plurality of lighting fixtures, comprising the steps of:
connecting a switching circuit to an ac power source for controllably providing on a power line current pulses of a first selected duration of the positive half cycles of the ac power source and for controllably providing on the same power line current pulses of a second selected duration, independent of the first selected duration, of the negative half cycles of the ac power source;
coupling the power line of the pulses of the positive and negative half cycles of the switching circuit to first and second, oppositely-poled diodes; and
connecting the first and second diodes to first and second lighting fixtures, respectively, such that the power supplied to the first and second lighting fixtures is independently controlled.

21. A dimming control method as defined in claim 20, wherein the step of connecting a switching circuit includes the steps of:
connecting first and second silicon-controlled rectifiers in parallel, opposed relationship and
providing first and second control pulse signal for independently switching the respective first and second silicon-controlled rectifiers on and off.

22. A dimming control method as defined in claim 21, wherein:
the step of connecting first and second silicon-controlled rectifiers in parallel, opposed relationship includes a step of electrically connecting together the control electrodes of such first and second silicon-controlled rectifiers; and
the step of providing first and second control pulse signals includes a step of applying the first and second control pulse signals to the control electrodes of both the first and the second silicon-controlled rectifiers.

* * * * *